METHOD OF FASTENING CONNECTING WIRES TO
ELECTRICAL COMPONENT PARTS
Filed Dec. 23, 1958
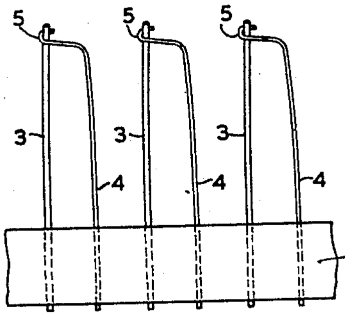
FIG.1
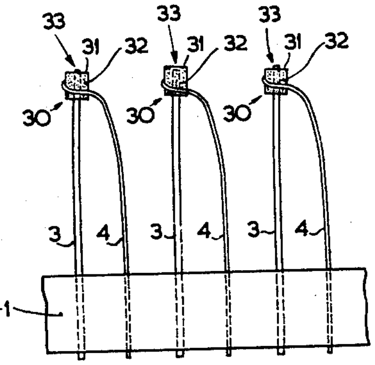
FIG.3
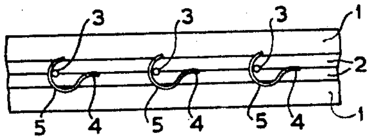
FIG.2
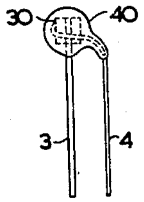
FIG.4
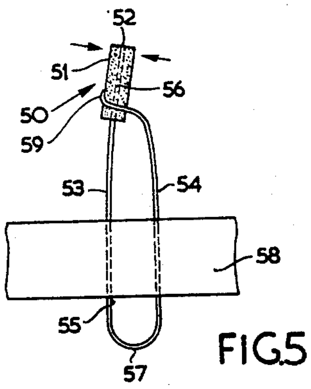
INVENTOR
ALBERTUS JUDOCUS FRANCISCUS MARIA VAN HOOF
MATHEUS JEANNE GERARDUS KNAPEN
HENRICUS PETRUS STAL
BY
Frank R. Jifani
AGENT 3,121,279
Patented Feb. 18, 1964

3,121,279

METHOD OF FASTENING CONNECTING WIRES TO ELECTRICAL COMPONENT PARTS

Albertus Judocus Franciscus Maria van Hoof, Matheus Jeanne Gerardus Knapen, and Henricus Petrus Stal, all of Eindhoven, Netherlands, assignors to North American Philips Company, Inc., New York, N.Y., a corporation of Delaware Filed Dec. 23, 1958, Ser. No. 782,531
Claims priority, application Netherlands Dec. 31, 1957
3 Claims. (Cl. 29—155.5)

The invention relates to a method of fastening connecting wires to an electrical component part having a cylindrical body of dielectric or semi-conductive material, this body having at least at one end an axial bore and a metal coating in this bore and on the outer side, and to electrical components thus provided with connecting wires.

It is known to slip a tubular electrical component provided internally and externally with a metal coating on the limb of a U-shaped piece of wire so that this limb projects beyond the two ends of the tube (U.S. Patent 2,999,-302). Thus the tube is held at a certain distance from the bend of the wire between the limbs of the U, each limb bearing on the metal coating. By dipping the tube, which is held by the wire, into a soldering bath, the pieces of wire concerned are secured to the coatings, after which the wire portion including the loop is cut at least at one spot. The simplest method is to have that limb of the wire which is to be secured to the external metal coating extend in the direction of length of the tube; it is known as an alternative to wind this limb of the wire a few times helically around the tube. The first method has the disadvantage that, when tapping the component immediately after its removal from the soldering bath in order to remove the excess quantity of solder from the interior of the tube, the connection between the limb extending along the component and the external metal coating is often interrupted. With the second method it is a comparatively circuitous, and difficult operation to wind one limb around the component.

The invention provides a method which does not exhibit the aforesaid disadvantage and which permits of obtaining further advantages.

In accordance with the invention the component is slipped over the end of a first piece of wire arranged in a holder. The end of a second piece of wire arranged in the holder, previously bent to form a half loop, the plane of which is more or less transverse to the direction of the two pieces of wire, is arranged around the periphery of the component so that the component is held tight between the wires owing to bending stress in the straight portions of the pieces of wire.

The two pieces of wire to be connected to the component may be separate wires. This has the advantage that, if desired, one piece of wire on which the component is arranged may have a larger diameter than the other piece. This may be advantageous for the subsequent mounting of the component on an insulating plate having a pattern of conductors in the form of printed wiring, the thicker wire thus holding the component rigidly in place.

In accordance with a further aspect of the invention the two pieces of wire intended for a component of comparatively great length may be formed by the limbs of a single, U-shaped wire, of which the portion near the bight is clamped tight in the holder, the component being held by the end initially remote from the bight during the immersion in the soldering bath, so that only the lower end of the component, where the half loop is provided, and otherwise the whole wire is immersed in the liquid solder, after which the wire is cut at least at one spot. It is thus ensured in a simple manner that the axial bore of the component is not entirely filled with solder and that at the same time the connecting wires are tin-plated throughout their length.

The invention will be described with reference to the drawing, which shows two embodiments. FIGS. 1 to 4 serve to illustrate the first embodiment, in which the invention is applied to short, ceramic, tubular capacitors, whereas FIG. 5 illustrates an example in which a comparatively long component is provided with connecting wires by the method according to the invention.

FIG. 1 is a side view of part of a holder with a few pairs of wire pieces and FIG. 2 is a plan view thereof.

FIG. 3 shows a further stage of the holder shown in FIG. 1, in which stage each pair of wires holds a short, tubular, ceramic capacitor and FIG. 4 shows such a capacitor in its finished state.

FIG. 5 shows a stage comparable with that of FIG. 3 in the application of connecting wires in accordance with the invention to a ceramic or semi-conductive, cylindrical component part of comparatively great length.

In the embodiment of the method according to the invention shown in FIGS. 1 to 4 a holder of two elongated, metal, rigid strips 1 coated on the sides facing each other with a rubber layer 2, have clamped in it the ends of a few pairs of wire pieces. Each pair of wire pieces consists of a thicker wire 3 and a thinner wire 4. The free end of each wire 4 is bent over in the form of a half loop 5. The plane of the loop 5 is approximately transverse to the direction of the wires 3 and 4. The loops 5 each engage the end of a straight wire 3 and the distance between the parts of the wires 3 and 4 held by the support 1 and the length of the bent-over part of the end of the wire 4 are such that each loop 5 bears on the end of the wire 3 with pretension by the resilient effect of the wire pieces (see FIGS. 1 and 2).

On the ends of the wire pieces 3 are then slipped ceramic tubular capacitors 30 so that the ends of the wire pieces 3 are approximately level with the head surfaces 31 of the capacitors 30 remote from the holder. These capacitors consist each of a tube of dielectric material, which is provided on the outer side with a metal coating 32 and on the inner side with a metal coating 33. The two coatings 32 and 33 may extend up to the ends of the ceramic tubes and be made, for example, of silver applied by burning. When arranging the tubes on the ends of the wire pieces 3, the loop 5 of the associated wire piece 4 is placed about the capacitor as shown, so that this loop, together with the end of the wire piece 3 holds the tube by the pretension in the wire pieces (FIG. 3).

Then the holder, with the wire pieces and the tubes held thereby, is lifted and turned upside down, so that the wire pieces are orientated downwards. In this position the capacitors and the ends of the wire pieces 3 are pressed for a moment on a flat surface, so that the end surfaces 31 of all tubes remote from the holder are on a level with the ends of the wire pieces 3. Then the tubes 30 with the parts of the wire pieces 3 and 4 in contact with the coatings 32 and 33 are dipped into liquid solder. After dipping and after cooling of the solder, the capacitors 30, then secured to the connecting wires 3 and 4, can be removed from the holder. As an alternative, the capacitors may be first enveloped in a protective lacquer by dipping them together into a lacquer bath similar to the dipping in the soldering bath. In this case the capacitors are removed out of the holder only after the lacquer has become dry and hard. Such a capacitor is shown in FIG. 4, in which the lacquer envelope is designated by 40. Since the two wires 3 and 4 have the same axial directions and since, moreover, the wire 3 is thicker than the wire 4, this capacitor is extremely suitable to be secured to a perforated, insulating plate with printed wiring.

FIG. 5 illustrates by way of example a method according to the invention, in which the component part to be provided with connecting wires has a comparatively long, tubular body 50 of ceramic or semi-conductive material. Both the interior and the exterior of this body are provided with a metal coating 51 and 52 respectively. This body is slipped onto the end of the right-hand limb 53 of a generally U-shaped piece of wire 55. The end 53 being introduced a comparatively small length into the central bore 56 of the body 50. The other limb 54 of the U-shaped wire piece 55 (clamped tight near the bend 57 in a holder 58, similar to the holder 1 in FIGS. 1 to 3) is bent over to form a half loop 59, the plane of which is transverse to the direction of the limbs 53 and 54.

This loop 59 is arranged about the lower end of the component part, when the latter is slipped onto the end of the right-hand limb 53, so that this loop engages the component part with pretension owing to the bending stress in the limbs of the wire piece. The part 50 is then embraced at the top and (see the arrows in FIG. 5) and the holder 58 is opened. The wire 55 is then dipped perpendicularly into a bath containing liquid solder down to such a depth that the solder reaches at least the height of the loop 59. By this dipping the two ends of the U-shaped wire 55 are mechanically and electrically secured to the two coatings of the part 50, while, at the same time, the wire 55 is tin-plated throughout its length.

The part 50 can then be dipped into a lacquer bath in the inverse position, it being held by the wire 55, for example at the bend 57. The wire 55 can be thus kept free of lacquer as far as it is not in contact with the part 50.

After the part 50 has been provided in the aforesaid manner with a protective lacquer layer, the wire 55 is cut at least at one spot near the bend 57.

What is claimed is:

1. A method of securing a pair of conductors to an electric component having an axial bore, said component having a metallic surface coating applied to the wall of the bore and the outer surface thereof comprising the steps of securing at least one pair of conductors in a holder so that they protrude therefrom in a common direction in spaced parallel relation, one of said conductors being relatively rigid and of heavier gauge than the associated conductor, said associated conductor having a transverse half loop formed at the end thereof remote from said holder and said conductors being related in said holder such that said loop encircles said one conductor and is in intimate contact therewith, inserting said one conductor into the bore of said component and placing said associated conductor about the outer surface of said component whereby said component is held in place by the clamping action between said conductors, and soldering said conductors to said coating by dipping the above described assembly in a solder bath.

2. The method according to claim 1 wherein said conductors are placed in said holder in parallel spaced relation such that said conductors are in bending stress when the loop of said associated conductor is encircling said one conductor and said conductors are then non-parallel.

3. A method of securing a pair of conductors to an electric component having an axial bore at least at one end thereof and also having a conductive coating on the walls of said bore and the outer surface of said component, providing a holder means, at least one pair of conductors consisting of a first conductor and a second conductor in said holder and protruding therefrom in a common direction, said second conductor having a half loop formed in the protruding end thereof, placing said first and second conductors in spaced parallel relation in said holder with the loop of said second conductor encircling and contacting said first conductor, adjusting the space between conductors in said holder such that said conductors are urged apart but remain in substantially parallel relation, placing the first conductor into the bore of said component and the second conductor being looped about the exterior surface of said component whereby said component is held in place by said conductors, and dipping the above described assembly to secure said conductors to the coated surfaces of said component and thereafter dipping the above described assembly for encapsulating said component.

References Cited in the file of this patent

UNITED STATES PATENTS

| | | |
|---|---|---|
| 1,979,528 | Bruce et al. | Nov. 6, 1934 |
| 2,321,071 | Ehrhardt | June 8, 1943 |
| 2,326,022 | Everett | Aug. 3, 1943 |
| 2,701,411 | Paine | Feb. 8, 1955 |
| 2,785,350 | Toppari | Mar. 12, 1957 |
| 2,828,454 | Khouri | Mar. 25, 1958 |
| 2,949,388 | Flournoy et al. | Aug. 16, 1960 |
| 2,999,302 | Beukema et al. | Sept. 12, 1961 |